US012771569B2

(12) United States Patent
Amodeo et al.

(10) Patent No.: US 12,771,569 B2
(45) Date of Patent: Oct. 20, 2026

(54) AUTOMATICALLY ADJUSTING DISPLAYED CAMERA ANGLE AND DISTANCE TO OBJECTS

(71) Applicant: Ford Global Technologies, LLC, Dearborn, MI (US)

(72) Inventors: Catherine Marie Amodeo, Livonia, MI (US); David Michael Herman, West Bloomfield, MI (US)

( * ) Notice: Subject to any disclaimer, the term of this patent is extended or adjusted under 35 U.S.C. 154(b) by 732 days.

(21) Appl. No.: 17/936,239

(22) Filed: Sep. 28, 2022

(65) Prior Publication Data

US 2024/0100947 A1 Mar. 28, 2024

(51) Int. Cl.

| | |
|---|---|
| ***H04L 12/40*** | (2006.01) |
| ***B60R 1/26*** | (2022.01) |
| *B60K 35/28* | (2024.01) |
| *B60K 35/81* | (2024.01) |

(52) U.S. Cl.

CPC ................ *H04L 12/40* (2013.01); *B60R 1/26* (2022.01); *B60K 35/28* (2024.01); *B60K 35/81* (2024.01); *B60K 2360/176* (2024.01); *B60R 2300/301* (2013.01); *B60R 2300/8066* (2013.01); *H04L 2012/40215* (2013.01); *H04L 2012/40273* (2013.01)

(58) Field of Classification Search

None

See application file for complete search history.

(56) References Cited

U.S. PATENT DOCUMENTS

| | | | |
|---|---|---|---|
| 6,476,730 B2 | 11/2002 | Kakinami et al. | |
| 9,315,175 B1 | 4/2016 | Reed et al. | |
| 10,836,376 B2 | 11/2020 | Wodrich et al. | |
| 11,341,614 B1 * | 5/2022 | Chen | G06T 7/73 |
| 2011/0202240 A1 * | 8/2011 | Rottner | B60Q 1/484 701/42 |

(Continued)

FOREIGN PATENT DOCUMENTS

| | | |
|---|---|---|
| CN | 104802712 A | 7/2015 |
| CN | 112776729 A | 5/2021 |

OTHER PUBLICATIONS

Behnam Behroozpour et al., Lidar System Architectures and Circuits, Integrated Circuits for Communications, IEEE Communications Magazine, Oct. 13, 2017, 135-142.

*Primary Examiner* — Angela Y Ortiz

*Assistant Examiner* — Laura E Linhardt

(74) *Attorney, Agent, or Firm* — Frank Lollo; Eversheds Sutherland (US) LLP

(57) ABSTRACT

The disclosure is generally directed to systems and methods for detecting that the vehicle is in a reverse mode, receiving a road surface topology, determining a feature of interest is within a collected image and outside a displayed field of view (FOV) for a rear-facing camera due to the road surface topology, adjusting the displayed FOV for the rear-facing camera to place the feature of interest within the displayed FOV. Receiving a reverse mode indication may be over a controller area network (CAN) bus in the vehicle. Receiving a road surface topology includes receiving an estimate of the road surface topology via at least one of monocular depth estimation, photogrammetric range imaging using structure from motion (SFM), multi-view stereo, imaging radar, lidar and a sensor system on the vehicle.

17 Claims, 7 Drawing Sheets

(56) References Cited

U.S. PATENT DOCUMENTS

| | | | | |
|---|---|---|---|---|
| 2012/0062743 | A1* | 3/2012 | Lynam | B60Q 9/005 348/148 |
| 2019/0277968 | A1 | 9/2019 | Lu et al. | |
| 2020/0247412 | A1* | 8/2020 | Wang | B60W 50/14 |
| 2022/0017014 | A1* | 1/2022 | He | G06T 7/70 |

* cited by examiner

AUTOMATICALLY ADJUSTING DISPLAYED CAMERA ANGLE AND DISTANCE TO OBJECTS

FIELD OF THE DISCLOSURE

This disclosure generally relates to vehicles, and more particularly relates to systems and methods for automatically adjusting camera field of view when vehicles are in reverse mode.

BACKGROUND

Vehicles must be driven in reverse, usually for short distances. Typical circumstances requiring reverse driving include driveways, parking and towing and the like. Driver assistance systems are capable of providing camera views to a driver that show object and estimates of distance of objects behind a vehicle. When a driver backs up on a hill or curved surface, some displays may not show a portion of the available imaging to assist the driver due to surface inclination or declinations and curvature of road topologies. The distortion correction in current images possibly may not display a portion of an image or other available data.

Thus, it is desirable to provide solutions that address the need for an enhance display for vehicles that accommodates irregular topologies when a vehicle is in reverse mode.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
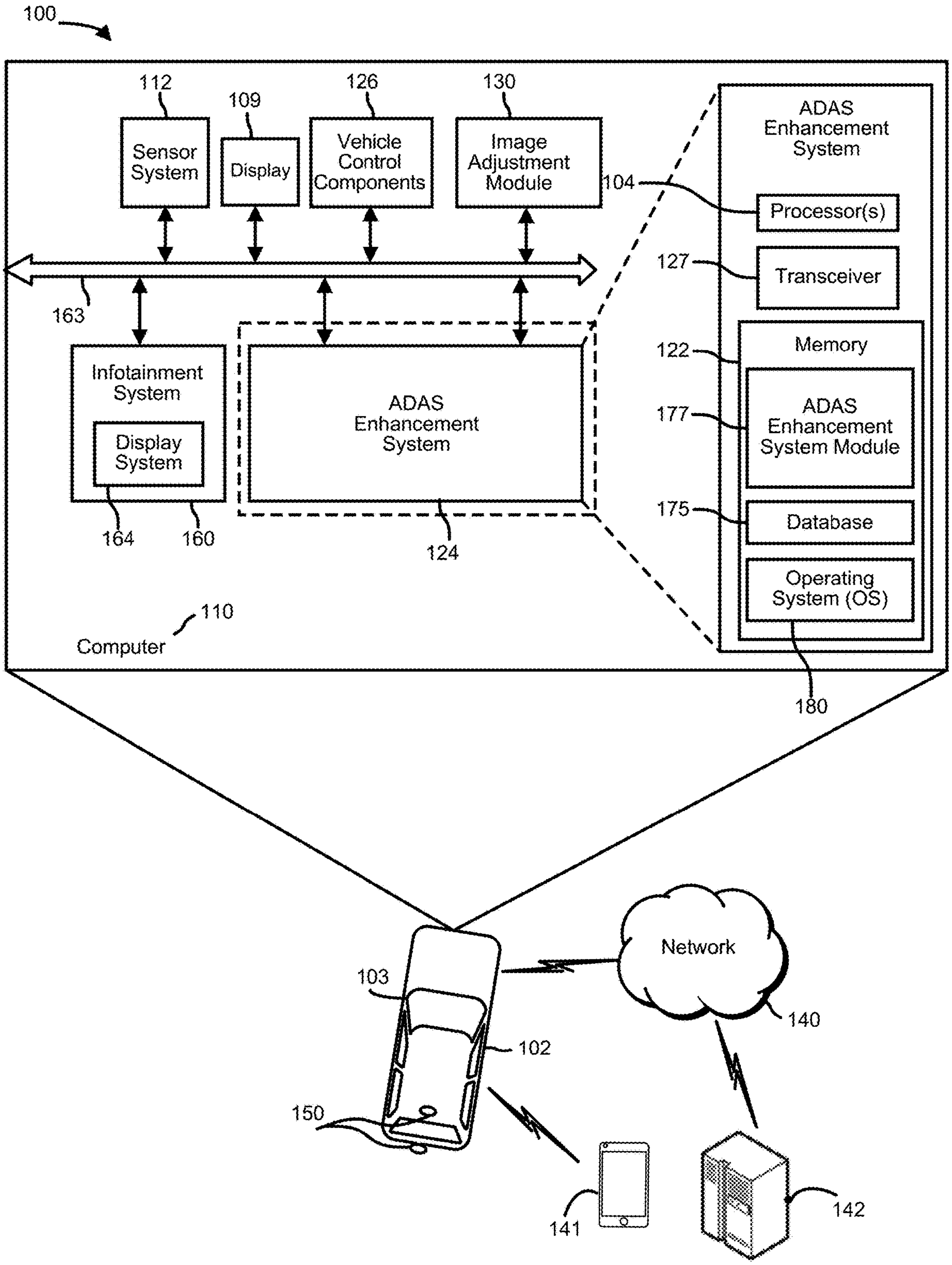
FIG. 1 illustrates an example system that includes a vehicle in accordance with an embodiment of the disclosure.

In terms of a general overview, this disclosure is generally directed to systems and methods for detecting that the vehicle is in a reverse mode, receiving a road surface topology, determining a feature of interest is within a collected image and outside a displayed field of view (FOV) for a rear-facing camera due to the road surface topology, and adjusting the displayed FOV for the rear-facing camera to place the feature of interest within the displayed FOV.

In one or more embodiments, the determining a feature of interest is within a collected image and outside a displayed field of view (FOV) for a rear-facing camera due to the road surface topology may include identifying the feature of interest using a sensor system including interior cameras, driver state monitoring cameras (DSMC), vehicle occupant monitoring sensors, light detection and ranging (lidar) sensors, radar in a two-dimensional spectral plane, ultrasonic sensors, and Ultra-Wideband (UWB) sensors.

In one or more embodiments, the adjusting the displayed FOV for the rear-facing camera to place the feature of interest within the displayed FOV, may include determining whether the feature of interest requires an adjustment of the displayed FOV in excess of a predetermined threshold from a nominal FOV for the rear-facing camera, and adjusting the displayed FOV if the adjustment enables the feature of interest to be presented within a display of the vehicle.

In one or more embodiments, determining whether the feature of interest requires an adjustment of the displayed FOV in excess of a predetermined threshold may include adjusting the displayed FOV via a translation adjustment affecting the position of the FOV, an extent adjustment affecting the stretch of the FOV, a look up table or an empirically derived equation.

One or more embodiments are also directed to a system for a vehicle including a plurality of sensors coupled to the vehicle, a rear-facing camera coupled to the vehicle, a memory coupled to the plurality of sensors and the rear-facing camera that stores computer-executable instructions, and a processor coupled to the memory, the processor configured to access the memory and execute the computer-executable instructions to detect that the vehicle is in a reverse mode, receive a road surface topology, In some embodiments, the reverse mode is detected by receiving a reverse mode indication over a controller area network (CAN) bus in the vehicle.

Another embodiment is directed to a vehicle, including a chassis, a motor coupled to the chassis, an on-board computer coupled to the chassis, the on-board computer including a memory and a processor coupled to the memory, the processor configured to execute one or more instructions to detect a reverse mode, receive a road surface topology, determine a feature of interest is within a collected image and outside a displayed field of view (FOV) for a rear-facing camera due to the road surface topology, and adjust the displayed FOV for the rear-facing camera to place the feature of interest within the displayed FOV for the rear-facing camera.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a mobile device such as a smartphone, refers to code (software code, typically) that is installed in the mobile device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

FIG. 1 illustrates an example system 100 that includes a vehicle 102. The vehicle 102 may be one of various types of vehicles with a chassis and may be a gasoline powered vehicle, an electric vehicle, a hybrid electric vehicle, or an autonomous vehicle, that is configured as a Level 2 or higher automated or semi-automated vehicle. The system 100 may be implemented in a variety of ways and can include various types of devices. For example, the example system 100 can include some components that are a part of the vehicle 102. The components that can be a part of the vehicle 102 can include a vehicle on-board computer 110, a sensor system 112 and a display 109. Thus, on-board computer 110 may be coupled to vehicle 102 and chassis 103, the on-board computer including at least a memory and a processor, such as memory 122 and processor 104 wherein the processor 104 is configured to execute steps indicated in image adjustment module 130. FIG. 1 further illustrates an infotainment system 160 which includes a display system 164 which may receive data for display from image adjustment module 130 via bus 163.

The vehicle on-board computer 110, in one or more embodiments, may be used to support features such as passive keyless operations, remotely-controlled vehicle maneuvering operations, and remote vehicle monitoring operations. Vehicle on-board computer 110 may further control some maneuvers performed by the vehicle 102 during the self-parking operation (referred to in the industry as a Remote Park Assist (RePA) operation) or other fully autonomous operations (L3-L5). There are display needs in such autonomous operations benefitted by embodiments described herein.

The vehicle on-board computer 110 may perform various functions such as controlling engine operations (fuel injection, speed control, emissions control, braking, etc.), managing climate controls (air conditioning, heating etc.), activating airbags, and issuing alerts (check engine light, bulb failure, low tire pressure, vehicle in a blind spot, etc.). In one or more embodiments, vehicle on-board computer 110 may enable a self-driving car or provide driver assistance. Thus, vehicle on-board computer 110 may further include an Advanced Driver-Assistance System ("ADAS") enhancement system 124, which is shown to further include, as one embodiment, the various components of the vehicle 102 that may be controlled, activated, and/or operated by the vehicle by the ADAS enhancement system 124.

In one implementation, the ADAS enhancement system 124 can be an independent device (enclosed in an enclosure, for example). In another implementation, some or all components of the ADAS enhancement system 124 can be housed, merged, or can share functionality, with vehicle on-board computer 110. For example, an integrated unit that combines the functionality of the ADAS enhancement system 124 can be operated by a single processor and a single memory device. In the illustrated example configuration, the ADAS enhancement system 124 includes a processor 104, a transceiver 127, and memory 122, ADAS Enhancement System Module 177, database 175 and operating system 180.

In one or more embodiments, communications network 140 includes a cellular or Wi-Fi communication link enabling vehicle 102 to communicate with network 140 which may connect to a remote server 142, which may include a cloud-based network or source for transferring data in accordance with this disclosure. Also shown is a mobile device 141, in communication with network 140, remote server 142 and vehicle 102, which enable vehicle to network (V2X) type operations.

Sensor system 112 of the on-board computer 110 may communicate with cameras and other sensors 150 of vehicle 102 in a manner that allows the vehicle on-board computer 110 to collect data therefrom. Data may be transmitted from cameras and other sensors 150 via a controller area network (CAN) bus network and an Ethernet connection. For example, bus 163 may be part of a CAN bus network as will be appreciated by one of skill in the art.

Examples of the camera and other sensors 150 that may be in communication with sensor system 112 may include sensors, radars and/or emitters capable of detecting objects, distances such as ultrasonic radar, Lidar, cameras and the like. In one or more embodiments, sensors/cameras 150 may further include one or more of Bluetooth®-enabled sensors, or Bluetooth® low energy (BLE)-enabled sensors, accelerometers, rate sensors, GPS sensors, and steering wheel sensors. Sensors 150 may include rear-facing cameras with different fields of view available. In one or more embodiments, rear-facing cameras may include wide angle cameras capable of sending data to displays within vehicle 102, such as over CAN bus or over network 140, in accordance with system requirements.

Figure 2:
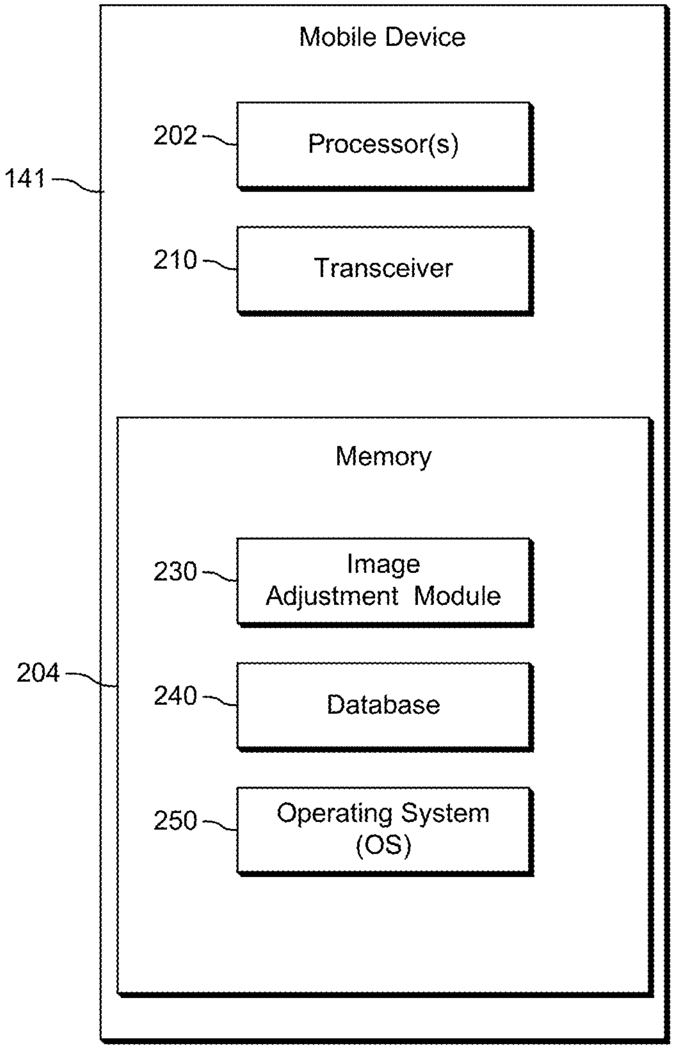
FIG. 2 illustrates some example functional blocks that may be included in a system for a vehicle in accordance with an embodiment of the disclosure.

Referring to FIG. 2, a mobile device 141 is shown in a simplified format configured to execute various operations in accordance with one or more embodiments.

As shown, in one embodiment, mobile device 141 includes components such as processor 202, transceiver 210, and memory 204, which is one example of a non-transitory computer-readable medium, may be used to store the operating system (OS) 240, database 230, and various modules such as image adjustment module 230. The various modules may be in the form of computer-executable instructions executed by the processor 210 for performing various operations such as adjusting images created by rear-facing cameras to accommodate angle and distance to objects in accordance with the disclosure. More particularly, image adjustment module 230 may be executed by the processor 210 in accordance with the disclosure, for determining whether a topology of a road justifies adjusting a field of view (FOV) to be shown on display 109 or via display system 164.

Referring back to FIG. 1, vehicle 102 includes sensor system 112 and one or more displays 109 which are coupled to receive signals from image adjustment module 130 or 230. More specifically, according to embodiments, image adjustment module 130 and 230 receives inputs from sensor system 112 in vehicle 102 via network 140 or directly from vehicle 102 using wireless communications from sensors and camera data and determines whether a topology of a road requires adjustment to a display for viewing by a driver prior to presentation by a display. For example, an exterior-facing camera view on a display 109 or via display system 164 may not provide helpful information to a driver if the topology of a road is twisted, uphill, or downhill by an amount that negates the accuracy of the data available to the driver. In such circumstances, a feature of interest, such as a piece of exercise equipment or some other stationary or moving object, or an oncoming large object may be viewable if a displayed FOV of the image captured by the sensor system is adjusted to enable the driver to view such features of interest on display 109 or display system 164.

In one or more embodiments, display 109 and/or display system 164 may be within a mirror, a heads-up display, on a dashboard within vehicle 102, or part of the infotainment system 160, such as display system 164. Any display showing a view of a rear-facing camera or sensor may be adjusted to provide enable viewing of a FOV that is altered to accommodate a topology.

As shown on FIG. 1, cameras 150 may include one or more rear-facing cameras such that the data received by camera(s) 150 that is provided to sensor system 112 may be provided to the image adjustment module 130 or to mobile device 141 to image adjustment module 230 to determine whether a road topology and/or a location of a feature of interest necessitates altering a displayed field of view (FOV) as shown on a display to the occupants of the vehicle 102. In some embodiments, if the feature of interest is outside a FOV due to the road topology, image adjustment module 130 or 230 may automatically alter a display to enable viewing the feature of interest.

Figure 3:
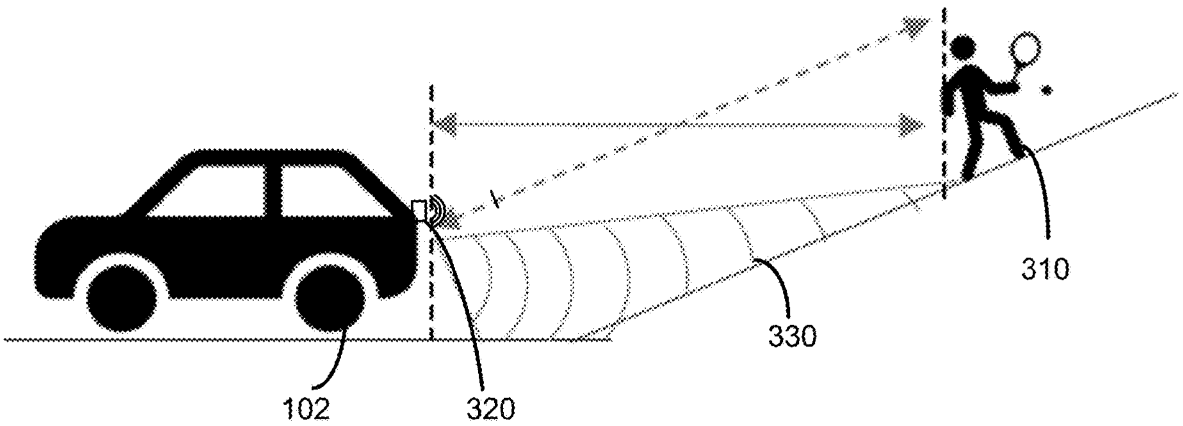
FIG. 3. illustrates a diagram of a vehicle reversing on a surface topology requiring an altered field of view in accordance with an embodiment of the disclosure.

Referring now to FIG. 3, a diagram illustrates vehicle 102 and a pedestrian 310 just outside of the field of view of a rear-facing camera, such as camera 320. FIG. 3 shows that if the vehicle 102 is in reverse mode, and the field of view 330 is illustrated to a driver, pedestrian 310 would not be visible on a display. Thus, a display within vehicle 102 would not show a pedestrian 310, or other object of interest, or at least not accurately with respect to distance.

Figure 4A:
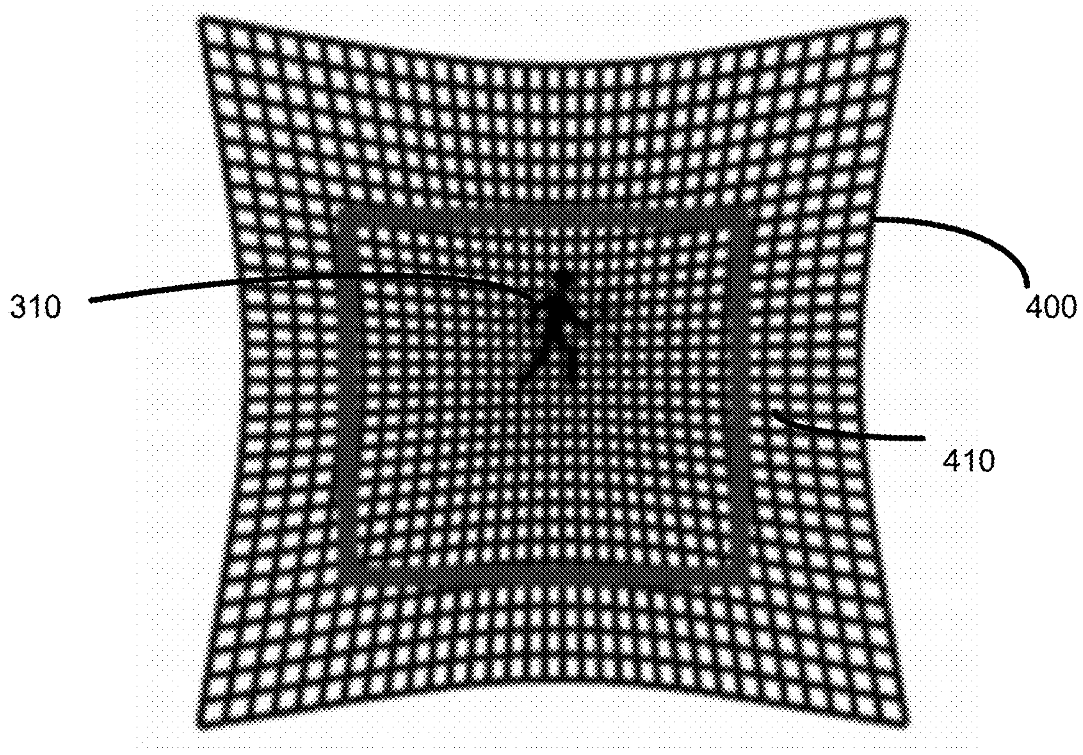
FIGS. 4A and 4B illustrate exemplary alternative fields of view for a rear-facing camera in a vehicle in accordance with an embodiment of the disclosure.
Figure 4B:
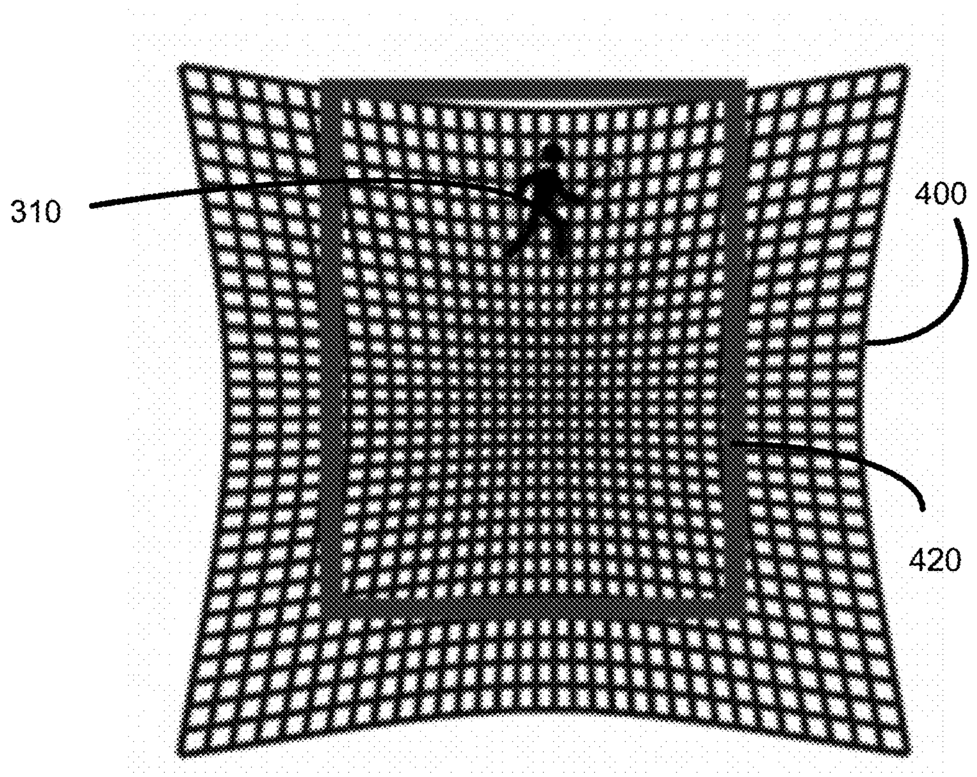

Referring to FIG. 4A and FIG. 4B, an undistorted raw image 400 illustrates two different fields of view of an image taken by the same rear facing camera, such as camera 320 in FIG. 3. FIG. 4A illustrates a normalized view indicated by the box 410 within raw image 400. This normalized view is presented to the driver or other passengers in vehicle 102 and represents the displayed FOV. According to the disclosure, the center of the raw image may be normalized for viewing by a driver to assist with reverse mode and illustrate scenes behind a vehicle. FIG. 4B illustrates an elongated view indicated by box 420 in accordance with an embodiment in which a feature of interest, such as a pedestrian 430, may not be clearly visible to a driver unless the visible displayed field of view is extended vertically or adjusted. For example, as shown in FIG. 3, vehicle 102 may be in reverse about to go uphill and would not see pedestrian 310 unless the displayed field of view for a rear-facing camera is elongated (e.g., adjusted) to accommodate the topology of the road. For example, if sensor system 112 detects that a topology may indicate and uphill or downhill topology, the displayed FOV may require adjustment so that the displayed FOV includes features of interest that are within a wide angle or fish-eye collected image but not with a default displayed FOV. In other embodiments, sensor system 112 received data from a red green blue-near infrared (RGB-NIR) sensor/camera that may shift to an infrared image based on ambient lighting to enable detection of topologies and obstacles of interest.

The view shown in FIGS. 4A and 4B may be presented via a SYNC™ system, a heads up display (HUD) system or any display within vehicle 102.

Figure 5A:
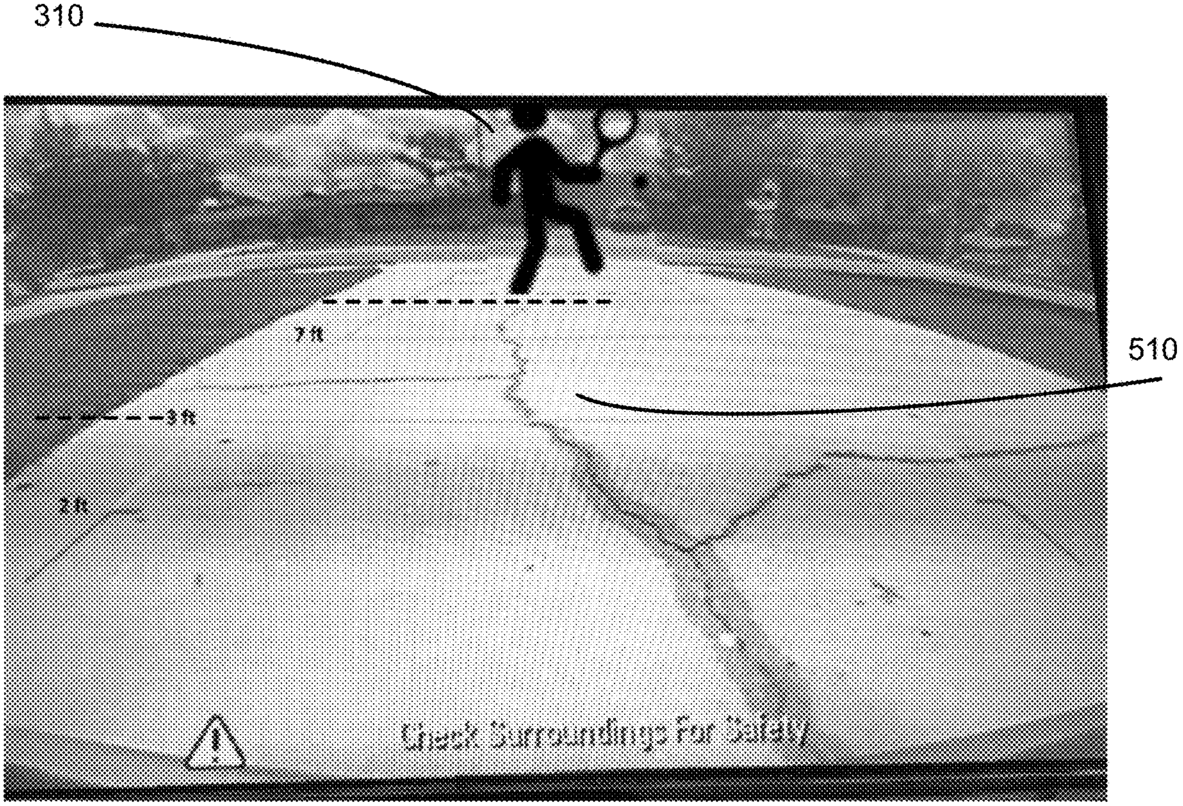
FIGS. 5A and 5B illustrate exemplary fields of view for a rear-facing camera as shown in a vehicle in accordance with an embodiment of the disclosure.
Figure 5B:
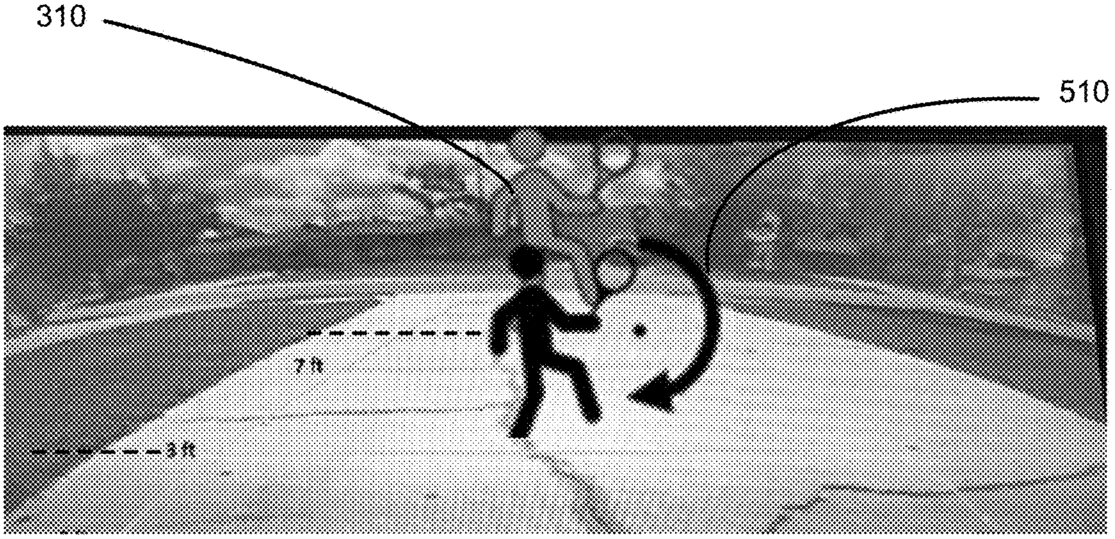

Similar to FIGS. 4A and 4B, referring now to FIGS. 5A and 5B a display as shown in vehicle 102 illustrates two different fields of view using the same rear-facing camera, such as cameras 150, when the driveway is angled upward from the location of the vehicle to the street. FIG. 5A illustrates distance markers 510 and pedestrian 310 prior to image adjustment, and because of the angle of the driveway, the distance markers may not be accurate. FIG. 5B illustrates the same pedestrian 310 with image adjustment moving the pedestrian to a more accurate position relative to the distance markers 510 by simply altering the field of view. Thus, the FOV is adjusted to better fit the pedestrian 310 in the middle of the screen and the distance markers are updated to reflect the accurate distance. For example, a functional logic may apply to the decision to implement an image adjustment based on a distance to contact calculation. Once such functional logic may include a calculation of whether the distance to contact or time of contact is between a predetermined time period based on the speed of vehicle 102.

Figure 6:
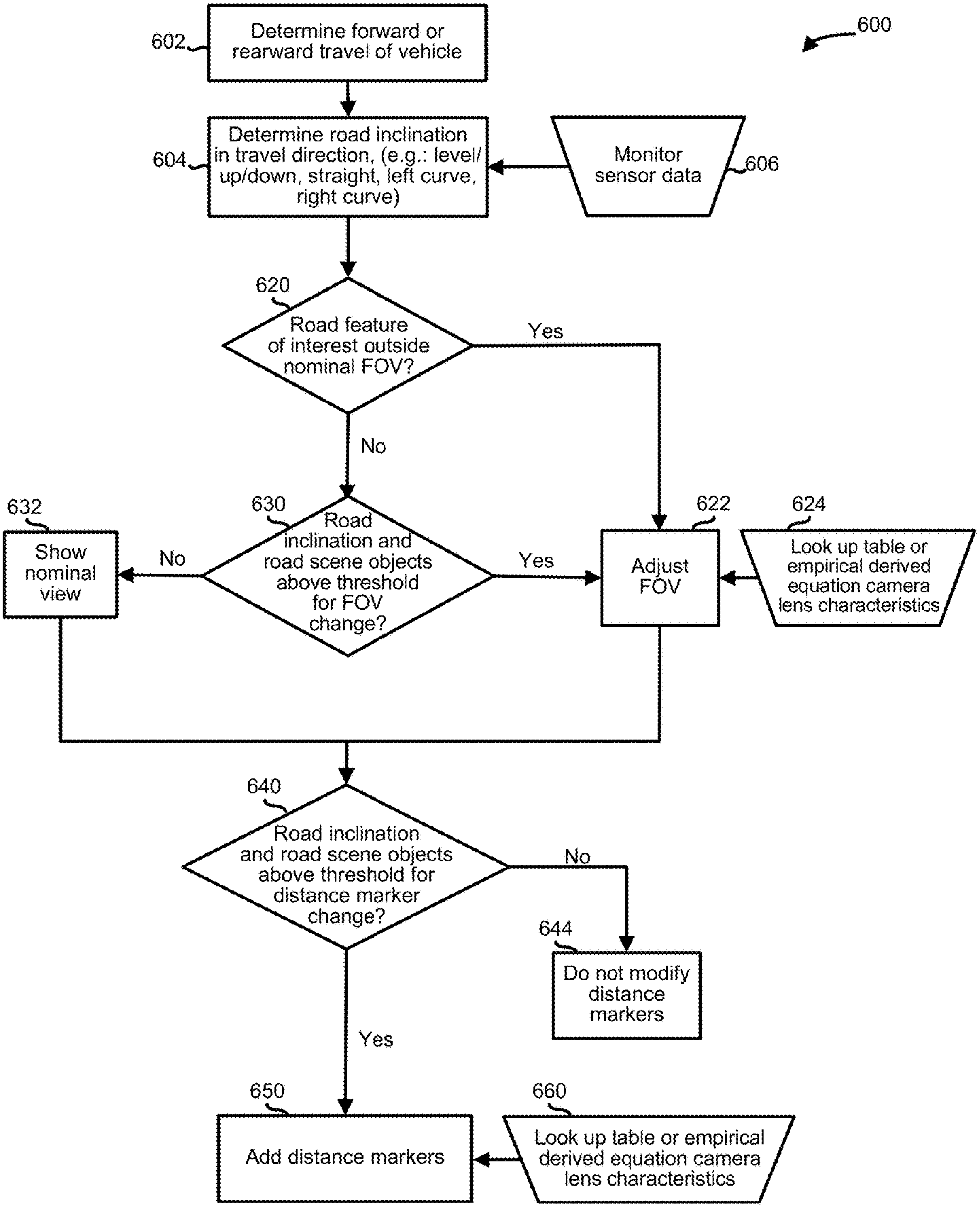
FIG. 6 illustrates a decision flow diagram in accordance with an embodiment of the disclosure.

Referring now to FIG. 6, a decision flow diagram illustrates one or more embodiments for adjusting a vehicle camera. For example, image adjustment module 130 may direct decisions for adjusting a rear-facing camera. Specifically, block 602 illustrates determining forward or rearward travel of vehicle. For example, vehicle 102 may have a controller area network CAN bus system network that is able to communicate with image adjustment module 130 that vehicle 102 is in a reverse mode. Next, Block 604 determining road inclination in travel direction. For example, level/up/down/straight or left curve or right curve. Block 606 provides for monitoring sensor data to detect road surface topology. There are several techniques for detecting a road surface topology. For example, monocular depth estimation, structure from motion, multi-view stereo, photometric stereo, and sensors. Lidar sensors, radar with two-dimensional spectral plane sensors, ultrasonic sensors, and Ultra-Wideband (UWB) sensors and other sensors may provide imaging to detect road surface topologies. Additionally, data including localization and high definition (HD) maps may be implemented to assist detected surface topologies, as will be appreciated by one of skill in the art with the benefit of this disclosure. Each of the different sensors and cameras may provide enough data to enable sensor fusion to produce a road surface topology estimate.

The decision flow diagram next provides in block 620 a decision of whether a road feature of interest is outside a nominal field of view (FOV). If yes, then the decision flows to adjusting the FOV in block 622. Block 524 provides for a look up table or empirical derived equation to determine camera lens characteristics for adjusting the FOV. For example, inputs used to look up adjustments may be included in the look up table. A look up table may be included that takes data from a sensor fusion that produces a road surface topology and estimates different options for the displayed FOV. For example, if a camera lens characteristics are that of a wide angle or fish-eye lens, then the characteristics of the lens are known, and the look up table may be preset based on the lens characteristics. The image produced will have known characteristics based on the lens and the estimated distances based on topology. Each rise of a road, for example, will have an angle that enables the known characteristics of a lens to estimate distances based on Pythagorean Theorem principles, which one of ordinary skill in the art with the benefit of this disclosure will appreciate. Thus, the displayed FOV of a collected image may be adjusted including a position (translation) and an extents (stretch) of the displayed FOV. For non-planar surfaces, those of skill in the art may apply non-planar surface geometric correction such as has been studied with point cloud guided geometric correction (PGGC) to compute compensating images using different sampling schemes to correspond to curved regions and edges. As will be appreciated, system limitations on available processing power may dictate the granularity of such techniques.

If no, decision block 630 asks if the road inclination and road scene objects or features of interest are above a threshold for a FOV change. In one embodiment, if the objects or features of interest are above, for example, a 10% threshold of the nominal displayed FOV, a FOV change may be made at block 622. For example, a pedestrian that is visible if a FOV is above the 10% threshold is shown in FIG. 4B. The image 400 must be extended vertically by a predetermined threshold to make pedestrian 310 visible since the normalized view seen by a driver of image 400 is limited to the FOV of 420. The predetermined threshold required to adjust a displayed FOV may be between 5 and 20% as may be appreciated by one of skill in the art with the benefit of this disclosure. For example, depending on the known topologies and areas of travel, some thresholds may be smaller or larger depending on such variables as distance, wheel-angle, and the like.

As shown in FIG. 4B, the FOV visible to the driver is stretched vertically to include pedestrian 310. If the pedestrian was not within a threshold, the displayed FOV may not be altered in accordance with system requirements. In some embodiments, even if the feature of interest is in the displayed FOV, an adjustment may be desired if close enough to the edges of the nominal displayed FOV. Block 632 provides that if the features of interest are visible and the road inclination does not cause the object to be more than 10% of the threshold for adjusting the FOV, then the image is presented within a displayed nominal view. Thus, no change to the displayed FOV would occur and a normalized, or nominal view would be displayed within the vehicle. In other embodiments, a display may include an image sensor fusion wherein radar, ultrasonics, lidar, and machine vision cameras may predict objects outside a FOV, or present an area that is occluded based on a fused representation to visualize areas beyond the edges of a color image.

Next decision block 640 asks if the road inclination and road scene objects above a threshold for distance marker change. More specifically, an object on an incline would appear higher in a displayed image and thus appear to be further away with uncorrected markers. For example, a threshold of plus or minus 0.5 feet of error at a distance of three feet would correct for a 10 degree incline. In another example, a threshold of a given percentage, such as 25% and an incline of 15 degrees would also result in a distance marker correction.

If not above the threshold, block 644 provides for not modifying distance markers presented on a vehicle display. If the road scene objects are visible within a display if an alteration is above a threshold, then block 650 provides for adjusting the distance markers. For example, as shown in block 660, a look up table or empirical derived equation may contribute to the camera lens characteristics to enable adjusting the distance marker on a vehicle display. Because most camera lens characteristics are known apriori, a look up table including different angles of road topology may be created or based on empirical data collected over time for a particular camera. Empirical data may also be determined during a calibration process. In one embodiment, a calibration process occurs and is altered over time based on collected data. A distance marker based on a flat road may then be altered to account for different road angles and the like based on the look up table using basic geometric principles, and the Pythagorean Theorem and the like. Thus, camera lens design may provide a set of camera calibration parameters that are available online or offline. In some embodiments, an image projection onto a road surface includes an estimate of inclination or a full-measured 3D surface. For flat road assumptions, some embodiments apply geometric calculations using ray tracing.

Figure 7:
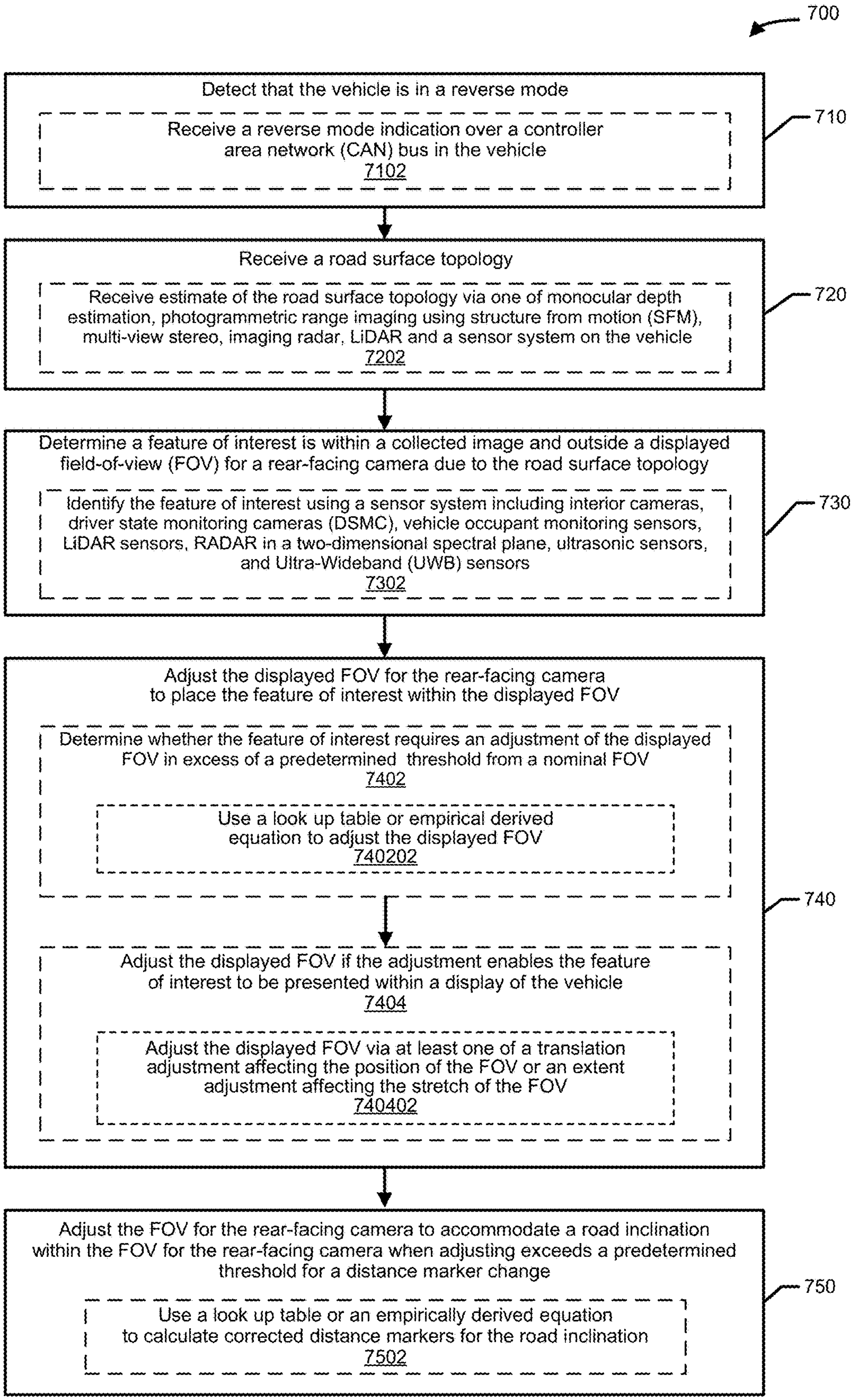
FIG. 7 illustrates a flow diagram of a method in accordance with an embodiment of the disclosure.

Referring now to FIG. 7, a flow diagram illustrates a method in accordance with an embodiment. Block 710 provides for detecting that a vehicle is in reverse mode. Within block 710 is optional block 7102 shown in dashed lines that provides for detecting reverse mode by receiving a reverse mode indicator over a controller area network (CAN) bus in the vehicle. For example, vehicle 102 in FIG. 1 illustrates a bus 163 capable of receiving a reverse mode indicator and providing the indicator to image adjustment module 130.

Block 720 provides for receiving a road surface topology. For example, as discussed above with respect to FIG. 5, different sensor systems are capable of producing a road surface topology by sensor fusion, lidar radar and the like. Within block 720 is optional block 7202 shown in dashed lines which provides for receiving an estimate of the road surface topology via at least one of monocular depth estimation, photogrammetric range imaging using structure from motion (SFM), multi-view stereo, imaging radar, lidar and a sensor system on the vehicle. For example, sensor system 112 in vehicle 102 as shown in FIG. 1 may receive signals from different sensors and provide the data to image adjustment module 130 for determining a road surface topology. In other embodiments, mobile device 141 may receive sensor data over a network or from vehicle 102 to enable image adjustment module 230, as shown in FIG. 2, to perform road surface topology calculations. Such data tray include localization data and high definition maps to increase accuracy of the road surface topology calculations.

Block 730 provides for determining a feature of interest is within a collected image and outside a displayed field of view (FOV) for the rear-facing camera. Within block 730 is optional block 7302 shown in dashed lines which provides for identifying the feature of interest using a sensor system including interior cameras, driver state monitoring cameras (DSMC), vehicle occupant monitoring sensors, lidar sensors, radar in a two-dimensional spectral plane, ultrasonic sensors, and Ultra-Wideband (UWB) sensors. For example, as shown in FIGS. 1 and 2, image adjustment module 130 and/or image module 230 may receive data to identify a feature of interest.

Block 740 provides for adjusting the displayed FOV for the rear-facing camera to place the feature of interest within the displayed FOV. For example, as shown in FIG. 3, a rear-facing camera with an FOV 320 would not be capable of viewing pedestrian 310 because of a hill preventing the displayed FOV 320 from showing the pedestrian even if the wide angle lens collected enough data to display the pedestrian 310. Within block 740 are optional blocks shown in dashed lines, 7402 and 7404. Block 7402 provides for determining whether the feature of interest requires an adjustment of the displayed FOV in excess of a predetermined threshold from a nominal FOV for the rear facing camera. Block 7404 provides for adjusting the displayed FOV if the adjustment enables the feature of interest to be presented within a display of the vehicle.

Within blocks 7402 is optional block 740202, also in dashed lines, provides for using a look up table or empirical derived equation to adjust the displayed FOV. For example, a look up table may provide different angles of a road up either uphill or downhill along with estimated distances for correction based on the camera lens characteristics. Rear-facing cameras on vehicles are typically wide angle lenses or fisheye lenses with known lens characteristics that enable look up tables to estimate distance distortions and the like. For example, as shown in FIGS. 5A and 5B, different fields of view are illustrated that show distortions due to wide angle lens characteristics and road topologies that may be corrected.

Within blocks 7404 is optional block 740402, also in dashed lines, which provides for adjusting the displayed FOV via at least one of a translational adjustment effecting the position of the displayed FOV or an extent adjustment affecting the stretch of the displayed FOV. For example, the known characteristics of a wide angle lens may enable a stretch of the displayed FOV to show a feature of interest or to accommodate for distance distortions. Further, a raw image would illustrate a feature of interest if a translation adjustment occurs as shown in FIG. 4, thus, a translation may take place. Likewise, if a road is curved, a stretch of the raw image may reveal a feature of interest.

Block 750 provides for adjusting the FOV for the rear-facing camera to accommodate a road inclination within the FOV for the rear-facing camera when adjusting exceeds a predetermined threshold for a distance marker change. For example, a predetermined threshold for the distance marker change may be less than a half of a foot in distance-to-object measurement error based on lens distortion characteristics of the rear-facing camera. In one or more embodiments, the predetermined threshold for the distance marker change is at least a ten percent alteration in the displayed FOV to accommodate the feature of interest. As one of skill in the art with the benefit of the present disclosure will appreciate, the predetermined threshold can be between 5 and 20 percent depending on different factors. Regardless of the threshold percentage, if a displayed FOV enables the feature of interest to be visible and is within a threshold, the visibility becomes paramount under some circumstances.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, mobile devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for a vehicle comprising:

detecting, by the vehicle, that the vehicle is in a reverse mode;

receiving, by the vehicle, road surface topology information;

capturing, by the vehicle using a rear-facing camera of the vehicle, an image of an environment behind the vehicle;

determining, by the vehicle and based on the image, that a feature of interest is outside a displayed field of view (FOV) of the rear-facing camera based on the road surface topology information;

determining, by the vehicle and based on the road topology information, one or more distance markers indicative of a distance between the vehicle and the feature of interest; and adjusting the displayed FOV of the rear-facing camera to place the feature of interest within the displayed FOV and displaying the one or more distance markers in an updated image of the environment behind the vehicle.

2. The method of claim 1 wherein the detecting that the vehicle is in the reverse mode further comprises:

receiving a reverse mode indication over a controller area network (CAN) bus in the vehicle.

3. The method of claim 1 wherein the receiving the road surface topology information further comprises:

receiving an estimate of road surface topology via at least one of monocular depth estimation, photogrammetric range imaging using structure from motion (SFM), multi-view stereo, imaging radar, lidar or a sensor system on the vehicle.

4. The method of claim 1 wherein the determining the feature of interest is outside the displayed FOV for the rear-facing camera further comprises:

identifying the feature of interest using a sensor system including interior cameras, driver state monitoring cameras (DSMC), vehicle occupant monitoring sensors, lidar sensors, radar in a two-dimensional spectral plane, ultrasonic sensors, or Ultra-Wideband (UWB) sensors.

5. The method of claim 1 wherein the adjusting the displayed FOV for the rear-facing camera to place the feature of interest within the displayed FOV, further comprises:

determining whether the feature of interest requires an adjustment of the displayed FOV in excess of a predetermined threshold from a nominal FOV for the rear-facing camera; and adjusting the displayed FOV if the adjustment enables the feature of interest to be presented within a display of the vehicle.

6. The method of claim 5, wherein the determining whether the feature of interest requires adjustment of the displayed FOV in excess of the predetermined threshold from the nominal FOV for the rear-facing camera, further comprises:

adjusting the displayed FOV using a look up table or empirical derived equation to adjust the displayed FOV.

7. The method of claim 5, wherein the adjusting the displayed FOV if the adjustment enables the feature of interest to be presented within the display of the vehicle, further comprises:

adjusting the displayed FOV via at least one of a translation adjustment affecting a position of the FOV or an extent adjustment affecting a stretch of the FOV.

8. The method of claim 1, further comprising using a look up table or an empirically derived equation to determine the one or more distance markers.

9. A system for a vehicle comprising:

a plurality of sensors coupled to the vehicle;

a rear-facing camera coupled to the vehicle;

a memory coupled to the plurality of sensors and the rear-facing camera that stores computer-executable instructions; and a processor coupled to the memory, the processor configured to access the memory and execute the computer-executable instructions to:

detect that the vehicle is in a reverse mode;

receive, using the plurality of sensors, road topology information;

capture, using the rear-facing camera, an image of an environment behind the vehicle;

determine that a feature of interest is outside a displayed field of view (FOV) of the rear-facing camera due to the road topology;

adjust the displayed FOV of the rear-facing camera to place the feature of interest within the displayed FOV for the rear-facing camera;

determine, based on the road topology information, one or more distance markers indicative of a distance between the vehicle and the feature of interest; and display an updated image of the environment behind the vehicle, the updated image including the one or more distance markers and being associated with the displayed FOV.

10. The system of claim 9, wherein the processor configured to execute instructions to detect that the vehicle is in a reverse mode further executes instructions to:

receive a reverse mode indication over a controller area network (CAN) bus in the vehicle.

11. The system of claim 9, wherein the processor configured to execute instructions to receive the road surface topology information further executes instructions to:

receive an estimate of road surface topology via at least one of monocular depth estimation, photogrammetric range imaging using structure from motion (SFM), multi-view stereo, imaging radar, lidar and a sensor system on the vehicle.

12. The system of claim 9, wherein the processor configured to execute instructions to determine the feature of interest outside the displayed field of view (FOV) for the rear-facing camera further executes instructions to:

identify the feature of interest using a sensor system including at least one of an interior cameras, driver state monitoring cameras (DSMC), vehicle occupant monitoring sensors, lidar sensors, radar in a two-dimensional spectral plane sensors, ultrasonic sensors, or Ultra-Wideband (UWB) sensors.

13. The system of claim 9, wherein the processor configured to execute instructions to adjust the displayed FOV for the rear-facing camera to place the feature of interest within the displayed FOV for the rear-facing camera is further configured to execute instructions to:

determine whether the feature of interest requires an adjustment of the displayed FOV in excess of a predetermined threshold from a nominal displayed FOV for the rear-facing camera; and adjust the displayed FOV if the adjustment enables the feature of interest to be presented within a display of the vehicle.

14. The system of claim 13, wherein the processor configured to execute instructions to determine whether the feature of interest requires an adjustment of the displayed FOV in excess of a predetermined threshold from the nominal FOV for the rear-facing camera, further executes instructions to:

adjust the displayed FOV using a look up table or empirical derived equation to adjust the displayed FOV.

15. The system of claim 13, wherein the processor configured to execute instructions to adjust the displayed FOV for the rear-facing camera to place the feature of interest within the FOV for the rear-facing camera when the adjustment exceeds the predetermined threshold, further executes instructions to:

adjust the displayed FOV via at least one of a translation adjustment affecting a position of the displayed FOV or an extent adjustment affecting a stretch of the displayed FOV.

16. The system of claim 9 wherein the one or more distance markers are determined based on a look up table or an empirically derived equation.

17. A vehicle comprising:

a chassis;

a motor coupled to the chassis;

an on-board computer coupled to the chassis, the on-board computer including a memory and a processor coupled to the memory, the processor configured to execute one or more instructions to:

detect a reverse mode;

receive road surface topology information;

determine a feature of interest is outside a displayed field of view (FOV) for a rear-facing camera;

determine, based on the road surface topology information, a distance marker indicative of a distance between the vehicle and the feature of interest;

adjust the displayed FOV for the rear-facing camera to place the feature of interest within the displayed FOV for the rear-facing camera; and include the distance marker in an updated image associated with the adjusted displayed FOV for the rear-facing camera.

* * * * *